United States Patent

Takagi et al.

[11] 4,187,732
[45] Feb. 12, 1980

[54] SHEAVE ASSEMBLY FOR V-BELT TYPE INFINITELY VARIABLE TRANSMISSIONS

[75] Inventors: Izumi Takagi; Shigeo Adachi, both of Akashi, Japan

[73] Assignee: Kawasaki Jukogyo Kabushiki Kaisha, Kobe, Japan

[21] Appl. No.: 849,219

[22] Filed: Nov. 7, 1977

[30] Foreign Application Priority Data

Nov. 12, 1976 [JP] Japan .......................... 51/152439[U]

[51] Int. Cl.² .............................................. F16H 55/52
[52] U.S. Cl. .................... 74/230.17 M; 74/230.17 E
[58] Field of Search ............... 74/230.17 M, 230.17 C, 74/230.17 E

[56] References Cited

U.S. PATENT DOCUMENTS

| | | | |
|---|---|---|---|
| 3,739,651 | 6/1973 | Lewis | 74/230.17 C X |
| 3,884,316 | 5/1975 | Bowers | 74/230.17 M X |
| 4,019,398 | 4/1977 | Wesemeier | 74/230.17 C |
| 4,033,195 | 7/1977 | Takagi et al. | 74/230.17 M |

*Primary Examiner*—Larry I. Schwartz
*Attorney, Agent, or Firm*—Stevens, Davis, Miller & Mosher

[57] ABSTRACT

Sheave assembly for V-belt type transmission including fixed and movable sheave elements which cooperate with each other. A rotatable disc is mounted on the sheave shaft and engaged with the movable sheave element through a cam device. The disc is adapted to be applied with braking force when the engine throttle valve is closed or when the vehicle equipped with the transmission is applied with a brake so that a cam force is produced to urge the movable sheave element toward the fixed sheave element.

3 Claims, 6 Drawing Figures

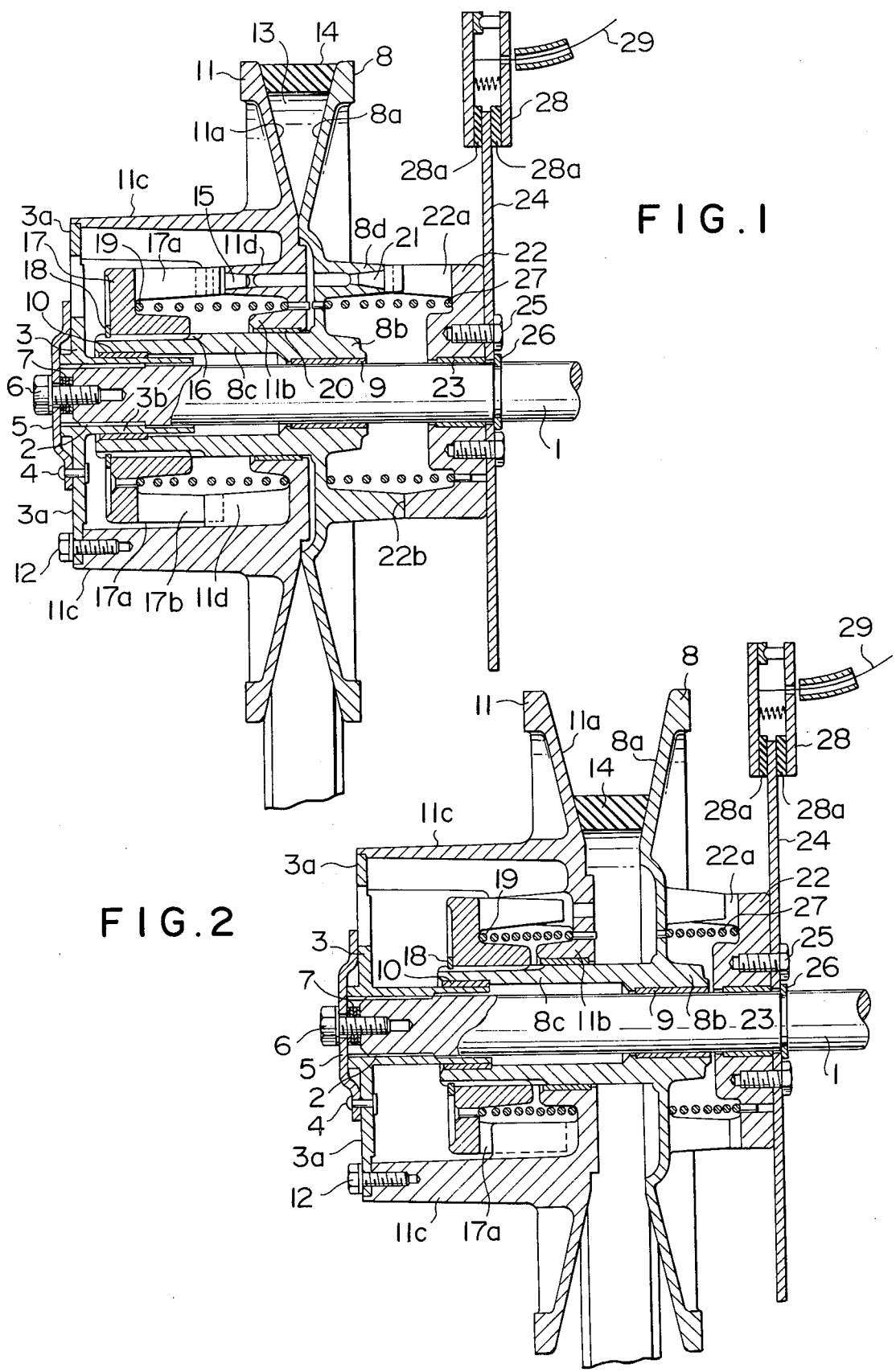

SHEAVE ASSEMBLY FOR V-BELT TYPE INFINITELY VARIABLE TRANSMISSIONS

The present invention relates to sheave assemblies for infinitely variable transmissions. More particularly, the present invention pertains to sheave assemblies including a fixed sheave element secured to a shaft and a movable sheave element mounted on said shaft for axial sliding movement and biased toward the fixed sheave element, the sheave elements co-operating each other to define a circumferential groove of substantially V-shaped cross-section for receiving a V-belt of the transmission.

Conventionally, V-belt type infinitely variable transmissions include a driven sheave assembly comprising a fixed sheave element which is secured to a driven shaft and a movable sheave element which is mounted on the shaft for sliding movement along the shaft and spring biased toward the fixed sheave element. The fixed and movable sheave elements have co-operating frustoconical side surfaces which define a circumferential groove of V-shaped cross-section therebetween. A V-belt is disposed in the V-shaped groove of the sheave assembly with the opposite sides thereof in pressure contact with the frustoconical side surfaces of the sheaves so as to ensure positive power transmitting engagement between the belt and the sheave assembly.

In this type of sheave assembly, it is expected that any slackening of the V-belt can be absorbed by the movement of the movable sheave element under the biasing force toward the fixed sheave element, such movement resulting in an increase in the effective diameter of the V-shaped groove in the sheave assembly. However, it has been experienced in transmissions having such sheave assemblies that the response of the movable sheave element has not been as quick as desired when the engine throttle valve is closed and the vehicle equipped with the transmission is allowed to continue its movement under inertia.

The present invention has therefore an object to provide a sheave assembly for an infinitely variable transmission which can provide a quicker response than conventional sheave assemblies.

Another object of the present invention is to provide a sheave assembly an infinitely variable transmission which includes means for urging the movable sheave element toward the fixed sheave element in response to certain operating conditions of a vehicle on which the transmission is mounted.

According to the present invention, the above and other objects can be accomplished by a sheave assembly for an infinitely variable transmission which comprises a shaft, a fixed sheave element secured to the shaft and having a frustoconical side surface, a movable sheave element mounted on said shaft for axial movement along the shaft, said movable sheave element having a frustoconical side surface located in opposed relationship with respect to the frustoconical side surface on the fixed sheave element to define a circumferential groove of substantially V-shaped cross-section between said side surfaces on the sheave elements for engagement with a V-belt of the transmission, means for resiliently biasing said movable sheave element toward said fixed sheave element, and means for applying, when actuated, a force to the movable sheave element to urge it toward the fixed sheave element. The last mentioned means may be constructed as by a plate rotatably mounted on the sheave shaft carrying a cam means which functions, when rotation of the plate is restrained, to produce the aforementioned force so as to urge the movable sheave element toward the fixed sheave element. Means may be provided to apply a braking force to the plate to restrain the rotation of the plate. Such means may be interconnected with the engine throttle valve actuating mechanism or the brake device which is provided in the vehicle on which the transmission is mounted in such a manner that the plate is restrained from rotation when the engine throttle valve is closed and/or when the brake device on the vehicle is actuated.

The above and other objects and features of the present invention will become apparent from the following descriptions of preferred embodiments taking reference to the accompanying drawings, in which:

FIG. 1 is a sectional view of a sheave assembly in accordance with one embodiment of the present invention;

FIG. 2 is a sectional view similar to FIG. 1 but showing the sheave assembly with the movable sheave element spaced apart from the fixed sheave element;

Figure 3:
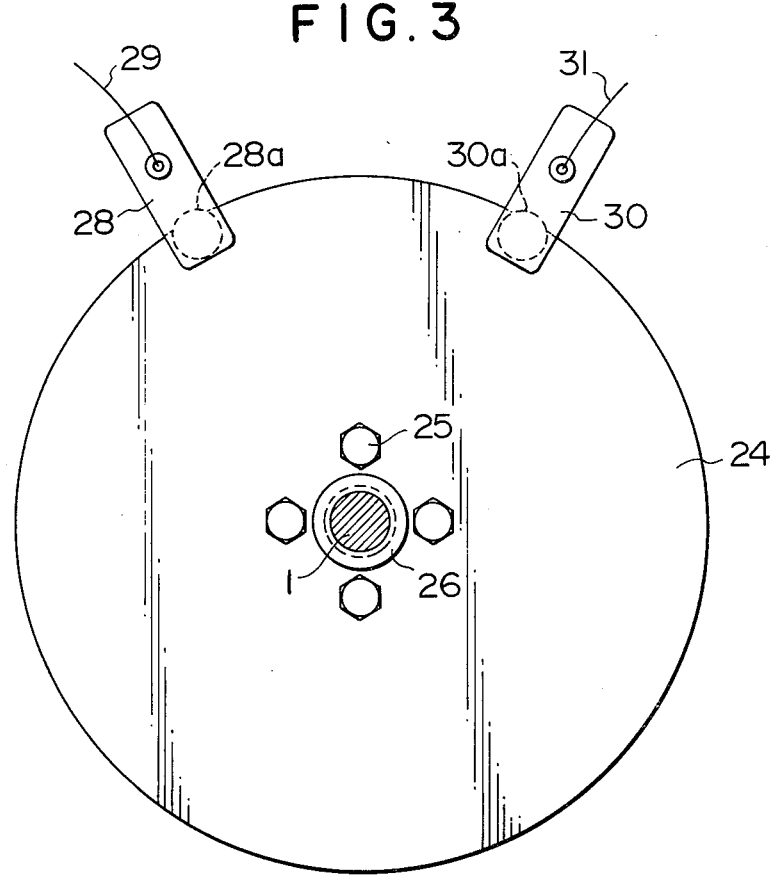
FIG. 3 is a side view showing the cam support disc used in the sheave assembly shown in FIGS. 1 and 2.

Referring now to the drawings, particularly to FIGS. 1 and 2, the sheave assembly shown therein includes a shaft 1 which is formed at an end with splines 2 to which a flange member 3 is engaged. The flange member 3 has a flange 3a and a sleeve portion 3b, and is fitted to the shaft 1 at the sleeve portion 3b. The flange member 3 has a plate 5 secured to the outer surface thereof by means of a rivet 4 and a bolt 6 is inserted through the plate 5 into the shaft 1 so as to secure the flange member 3 to shaft 1. Where desired, a suitable number of shims 7 may be disposed between the plate 5 and the adjacent end of the shaft 1.

On the shaft 1, there is mounted a movable sheave element 8 which has a frustoconical surface 8a and a cylindrical central boss 8b. The boss 8b of the movable sheave element 8 is mounted on the shaft 1 through a cylindrical bush 9 which allows axial sliding movement of the element 8. The boss 8b has a cylindrical axial extension 8c which is supported at its terminal end through a bush 10 by the sleeve portion 3b of the flange member 3.

The sheave assembly further includes a fixed sheave element 11 having a frustoconical surface 11a which is confronting to the frustoconical surface 8a of the movable element 8 to define a circumferential groove 13 of substantially V-shaped configuration. The element 11 further has a central boss 11a which is mounted through a bush 20 on the cylindrical extension 8c of the movable element 8 and a cylindrical portion 11c which is encircling the boss 11b and secured by means of bolts 12 to the flange portion 3a of the member 3.

Figure 4:
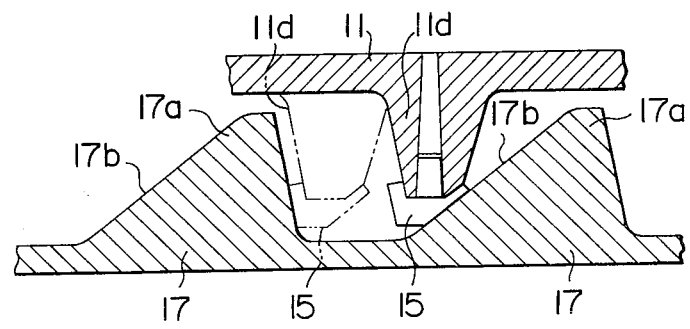
FIG. 4 is a fragmentary sectional view showing the cam mechanism adopted as a part of the biasing mechanism.

The cylindrical extension 8c of the movable sheave has splines 16 on its outer surface and a cam bracket 17 is engaged with the splines 16. A snap ring 18 is fitted to the extension 8c for restraining axial movement of the cam bracket 17. The cam bracket 17 has a plurality of axially extending cam lobes 17a which have cam slopes 17b as shown in FIGS. 1 and 4. Between the boss 11b and the cylindrical portion 11c, the fixed sheave element 11 is formed with axial projections 11d respectively corresponding to the cam lobes 17a on the cam bracket 17. Each of the projections 11d carries a cam follower shoe 15 which engages the cam slope 17b on the corresponding cam lobe 17a. A torsion spring 19 is disposed between the fixed sheave element 11 and the cam bracket 17 for biasing the cam bracket 17 in such a direction that the movable element 8 is resiliently forced toward the fixed element 11 through the cam action of the cam slopes 17b. A V-belt 14 is disposed in the V-shaped groove 13 with the opposite sides thereof in pressure contact with the surfaces 8a and 11a on the elements 8 and 11.

Figure 5:
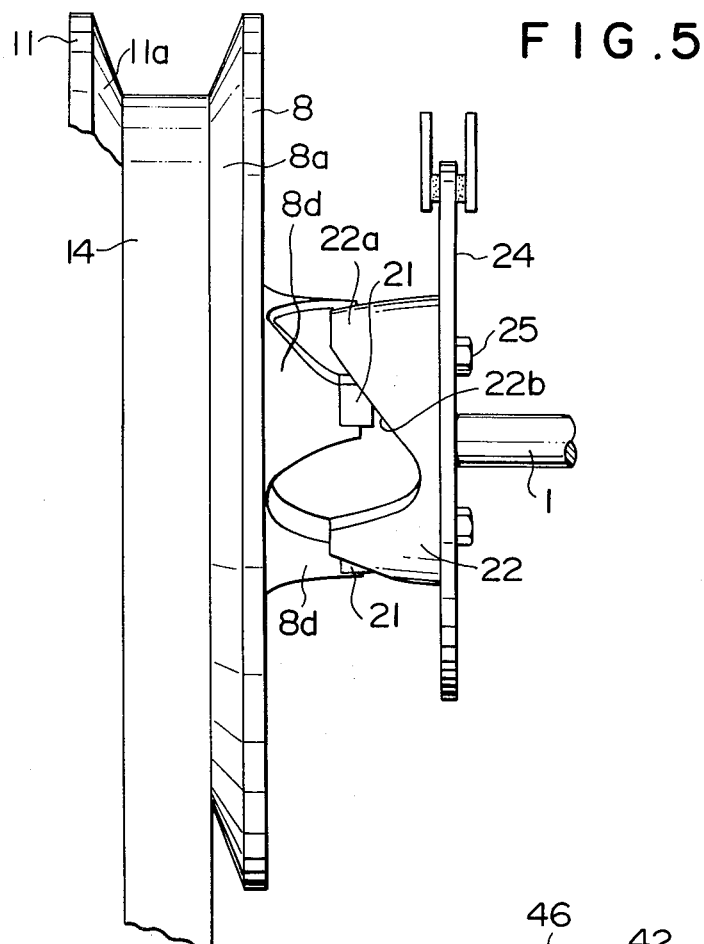
FIG. 5 is a fragmentary side view specifically showing the cam device carried by the cam support disc.

The movable sheave element 8 further has a plurality of projections 8d axially extending in the direction opposite to the cylindrical extension 8c as shown in FIGS. 1 and 5. Each of the projections 8d carries a cam follower shoe 21. The shaft 1 carries a cam support disc 24 which has a cam bracket 22 secured thereto by means of bolts 25. The cam bracket 22 is mounted on the shaft 1 through a bush 23 and has axially extending cam lobes 22a including cam slopes 22b which are adapted to be engaged with the cam follower shoes 21 on the respective projections 8d. A torsion spring 27 is provided between the movable element 8 and the cam bracket 22 for maintaining firm engagement between the shoes 21 and the cam slopes 22b. A snap ring 26 is provided on the shaft 1 for restraining the axial movement of the disc 24.

A brake assembly 28 is provided for cooperation with the outer peripheral portion of the disc 24. The assembly 28 includes a pair of friction shoes 28a which are adapted to engage the opposite sides of the disc 24 upon actuation of a cable 29. The cable 29 may be interconnected with an engine throttle valve actuating mechanism (not shown) so that a braking force is applied to the disc when the engine throttle valve is closed. A further brake assembly 30 having shoes 30a may additionally be provided as shown in FIG. 3 and the actuating cable 31 of such assembly may be interconnected with a brake device of the vehicle on which the transmission having the sheave assembly is mounted.

The above described sheave assembly is usually incorporated in a V-belt type vehicle transmission at the driven side thereof. More specicially, the V-belt 14 is passed around a driving sheave assembly (not shown) which is adapted to be driven by a vehicle engine (not shown). In operation, as the effective diameter of the driving sheave assembly increases, the movable sheave element 8 of the driven sheave assembly is moved away from the fixed sheave element 11 under the tension of the belt 14 against the action of the torsion spring 19 which is applied to the movable element 8 through the shoes 15 on the projections 11d and the cam slopes 17b on the cam bracket 17. Thus, the movable sheave element 8 is maintained at a position such as that shown in FIG. 2. The belt 14 is driven by the driving sheave assembly and the power is transmitted through the frictional engagement between the belt and the sheave element surfaces 8a and 11a to the driven sheave assembly. The rotation of the movable sheave element 8 is transmitted through the projections 8d and the cam lobes 22a on the cam bracket 22 to the cam support disc 24.

When the engine throttle valve is closed or when the vehicle brake device is actuated to decelerate the vehicle, the effective diameter of the driving sheave assembly is decreased in a manner well known in the art. At this instance, the brake assembly 28 or the other brake assembly 30 is actuated to restrain the rotation of the disc 24. As the result, the movable sheave element 8 is rotated with respect to the disc 24 and the movable sheave element 8 is forced through the engagement of the cam slopes 22b and the cam follower shoes 21 on the projections 8d toward the fixed sheave element 11. Thus, the V-belt 14 is displaced in the groove 13 radially outwardly and any slackening of the V-belt 14 can be absorbed without delay.

When the vehicle is allowed to continue to run under inertia with the engine throttle valve closed, the rotation of the movable sheave element 8 is retarded so that the element 8 is angularly displaced with respect to the fixed sheave element 11. In this instance, the cam follower shoes 15 on the projections 11d abut the cam lobes 17a at the sides opposite the cam slopes 17b as shown by phantom lines in FIG. 4. Therefore, it is possible to avoid direct contact of the projections 11d with the cam lobes 17a.

Figure 6:
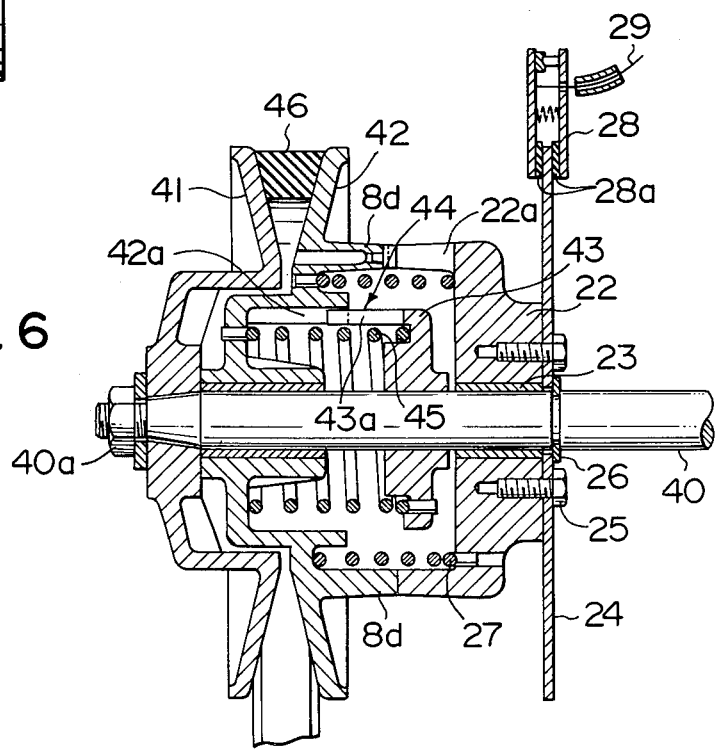
FIG. 6 is a sectional view showing another embodiment of the present invention.

Referring now to FIG. 6 which shows another embodiment of the present invention, the sheave assembly shown therein includes a shaft 40 having a fixed sheave element 41 directly mounted on one end thereof and secured thereto by means of a nut 40a. A movable sheave element 42 is mounted to the shaft 40 for axial sliding movement and co-operates with the fixed sheave element 41. On the shaft 40, there is also mounted a cam bracket 43 which is secured to the shaft 40 and has axially extending cam lobes 43a. The movable sheave element 42 is formed with axial projections 42a which co-operate with the cam lobes 43a to constitute a cam device 44. A torsion spring 45 is provided between the cam bracket 43 and the movable sheave element 42 so as to bias the projections 42a on the movable sheave element 42 into positive engagement with the cam lobes 43a on the cam bracket 43. As in the previous embodiment, a cam bracket 22 is mounted on the shaft 40 through a bush 23 and secured by means of bolts 25 to a cam support disc 24. A brake assembly 28 having brake shoes 28a is also provided so as to apply a braking force to the disc 24 when the actuating cable 29 is pulled. The cam bracket 22 has axially extending cam lobes 22a which co-operate with axial projections 8d on the movable element 42. As in the previous embodiment, a torsion spring 27 is provided between the cam bracket 22 and the movable sheave element 42. The operation of this embodiment is substantially the same as that in the previous embodiment so that any further description will not be necessary.

The invention has thus been shown and described with reference to specific embodiments, however, it should be noted that the invention is in no way limited to the details of the illustrated structures but changes and modifications may be made without departing from the scope of the appended claims.

I claim:

1. Sheave assembly for a V-belt type infinitely variable transmission comprising a shaft, a fixed sheave element secured to the shaft and having a frustoconical side surface, a movable sheave element mounted on said shaft for axial movement along the shaft, said movable sheave element having a frustoconical side surface located in opposed relationship with respect to the frustoconical side surface on the fixed sheave element to define a circumferential groove of substantially V-shaped cross-section between said side surfaces on the sheave elements for engagement with a V-belt of the transmission, means for resiliently biasing said movable sheave element toward said fixed sheave element, cam means provided between said movable sheave element and a member rotatably mounted on said shaft, means provided for applying retarding force to said rotatable member so as to produce a relative displacement between said movable sheave element and said member, said cam means being responsive to said relative displacement to produce a cam force which urges said movable sheave element toward said fixed sheave element.

2. Sheave assembly in accordance with claim 1 in which said cam means includes a member rotatably mounted on the shaft, cam lobe means formed on one of the movable sheave element and the rotatable member, and cam follower means provided on the other of the movable sheave element and the rotatable member and being adapted to engage said cam lobe means.

3. Sheave assembly in accordance with claim 2 in which said rotatable member is a disc and said retarding force applying means is brake means cooperating with said disc.

* * * * *